(12) United States Patent
Ilyashenko

(10) Patent No.: US 6,776,932 B1
(45) Date of Patent: *Aug. 17, 2004

(54) POLYMERIC OPTICAL ARTICLES

(75) Inventor: Victor M. Ilyashenko, Northborough, MA (US)

(73) Assignee: Getronics Wang Co. LLC, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/445,733

(22) PCT Filed: Jun. 12, 1998

(86) PCT No.: PCT/US98/12295

§ 371 (c)(1),
(2), (4) Date: Aug. 29, 2000

(87) PCT Pub. No.: WO98/57204

PCT Pub. Date: Dec. 17, 1998

(51) Int. Cl.$^7$ ............................................. B29D 11/00
(52) U.S. Cl. ...................... 264/1.24; 264/1.29; 264/1.7; 264/2.1
(58) Field of Search ............................... 264/1.24, 1.28, 264/1.29, 1.6, 1.7, 2.7, 2.1; 385/124; 428/374, 375

(56) References Cited

U.S. PATENT DOCUMENTS

| | | |
|---|---|---|
| 3,718,383 A | 2/1973 | Moore |
| 3,816,160 A | 6/1974 | Moore |
| 3,955,015 A | 5/1976 | Ohtsuka et al. |
| 4,022,855 A | 5/1977 | Hamblen |
| 4,587,065 A | 5/1986 | Kouichi et al. |
| 4,689,000 A | 8/1987 | Kouichi et al. |
| 4,966,435 A | 10/1990 | Matsumoto et al. |
| 5,076,659 A | 12/1991 | Bekiarian et al. |
| 5,175,786 A | 12/1992 | Toyoda et al. |
| 5,235,660 A | 8/1993 | Perry et al. |
| 5,253,323 A | 10/1993 | Koike et al. |

(List continued on next page.)

FOREIGN PATENT DOCUMENTS

| | | |
|---|---|---|
| CA | 2188215 A1 | 4/1997 |
| EP | 0 472 384 A3 | 2/1992 |
| EP | 0 606 598 A2 | 7/1994 |
| EP | 0 615 141 A1 | 9/1994 |
| EP | 0 710 855 A1 | 5/1996 |
| EP | 0 752 598 A1 | 1/1997 |
| EP | 0 911 657 A1 | 4/1999 |
| JP | 8-114714 A | 5/1996 |
| WO | WO 97/10285 | 3/1997 |
| WO | WO 98/07057 | 2/1998 |

OTHER PUBLICATIONS

Y. Koike, "High–Bandwidth Graded–Index Polymer Opitcal Fiber", Journal of Lightwave Technology, vol. 13, No. 7, pp. 1475–1489, Jul. 1995.

T. Ishigure et al., "High bandwidth and high numerical aperture graded–index polymer optical fibre", Electronics Letters, vol. 30, No. 14, pp. 1169–1171, Jul. 1994.

E. Nihei et al., "Present Prospect of Graded–Index Plastic Optical Fiber in Telecommunication," IEICE Trans. Electron., E80–C(1): 117–122 (1997).

*Primary Examiner*—Mathieu D. Vargot
(74) *Attorney, Agent, or Firm*—Wolf, Greenfield & Sacks, P.C.

(57) ABSTRACT

Polymeric optical articles, including gradient index optical preforms and fiber produced therefrom, are described. Methods for producing the optical articles using platicizers and/or dopants in the sheathing of the articles are also described. Gradient index optical articles made according to the invention have excellent optical characteristics, enhanced mechanical properties and environmental stability, and enable more flexibility in the selection of materials.

13 Claims, 2 Drawing Sheets

U.S. PATENT DOCUMENTS

| | | |
|---|---|---|
| 5,258,144 A | 11/1993 | Yean et al. |
| 5,262,896 A | 11/1993 | Blankenbecler |
| 5,382,448 A | 1/1995 | Koike et al. |
| 5,541,247 A | 7/1996 | Koike |
| 5,555,525 A | 9/1996 | Ho et al. |
| 5,593,621 A | 1/1997 | Koike et al. |
| 5,614,253 A | 3/1997 | Nonaka et al. |
| 5,639,512 A | 6/1997 | Nonaka et al. |
| 5,729,645 A | 3/1998 | Garito et al. |
| 5,760,139 A | 6/1998 | Koike et al. |
| 5,763,514 A | 6/1998 | Koike |
| 5,767,200 A | 6/1998 | Koike |
| 5,783,636 A | 7/1998 | Koike et al. |
| 5,851,666 A | 12/1998 | Nonaka et al. |
| 5,891,570 A | 4/1999 | Nonaka et al. |
| 5,911,025 A | 6/1999 | Garito et al. |
| 5,916,495 A | 6/1999 | Nonaka et al. |
| 6,086,999 A | 7/2000 | Ilyashenko |

POLYMERIC OPTICAL ARTICLES

GOVERNMENT FUNDING

The invention described herein was made in whole or in part with government support under a contract issued by the Defense Advanced Research Projects Agency (DARPA) in response to DARPA solicitation #BAA96-29 and under contract number DAA20L-94-C-3425 with the Defense Advanced Research Projects Agency (DARPA). The United States Government may have certain rights in the invention.

This application is a national stage filing under 35 U.S.C. §371 of International application no. PCT/US98/12295 filed 12 Jun. 1998, which was published under PCT Article 21(2) in English. This International Application claims priority to U.S. patent application Ser. No. 08/873,952 entitled "Method for Producing a Graded Index Plastic Optical Material," by Victor M. Ilyashenko, filed Jun. 12, 1997, now U.S. Pat. No. 6,086,999 issued Jul. 11, 2000.

BACKGROUND OF THE INVENTION

Optical resin materials which are characterized by a distributed refractive index have proved useful in the construction of optical conductors such as, optical fibers, optical waveguides, optical integrated circuits, and the corresponding preforms from which these optical conductors are fabricated. In general, plastic or polymeric optical fibers (POF) are considered an attractive alternative to copper cable and glass optical fibers. Typically, the plastic optical fiber (or thin, flexible optical rod) has an elongated core within which the majority of the light travels in a generally axial direction and a sheathing layer which coaxially surrounds the core and confines the light to the core due to its having an index of refraction less than that of the core.

The refractive index distribution of plastic optical fibers can be classified as either a gradient (or graded) index or step index. However, gradient index plastic optical fibers (GI POF) are preferred over step index fibers for many data communication applications due to their superior bandwidth capacity. The index of refraction in a gradient index plastic optical fiber has a distribution that continuously changes within the core of the fiber, generally decreasing radially from a maximum value at the core central axis outwardly until it approaches the lower index of refraction of the sheathing at or near the core-sheathing interface. Due to this continuously varying refractive index within the core, the optical fiber acts like a lens tending to refocus light rays, reducing their propagation in non-axial directions, so that light rays entering the core at a small angle, with respect to the axis, follow undulating paths with relatively small deviations from the axial direction when compared to light propagation in a step index type fiber. In addition, the speed of the light rays following undulating paths is higher in the regions of lower refractive index so that the total travel time for light rays following undulating paths is nearly equal to those following a straight axial path. This results in, for example, a fiber with a wider bandwidth of transmission with minimal modal dispersion and a more rapid information flow than that obtained with step index plastic optical fibers.

In general, typical methods of fabricating gradient index plastic optical fibers involve preparation of a polymeric sheathing and a polymeric core disposed within the sheathing in a coaxial configuration. The refractive index of the core and sheathing are different and, for most optical conducting applications, the refractive index of the core is greater than that of the sheathing. Frequently, the core is made of the same polymer as that which comprises the sheathing but, in addition, further includes a non-polymeric substance (commonly referred to as a dopant) which increases the refractive index of the core so that it is greater than that of the sheathing. (See for example, U.S. Pat. No. 5,541,247 to Koike.)

However, currently available methods of fabrication have significant shortcomings. For example, the type and amount of dopant substances which can be incorporated into the core and still provide a gradient index plastic optical article which maintains both sufficient optical transparency and an acceptable difference in the refractive index between the sheathing and the core, are limited. Therefore, a need exists for methods and materials useful for fabricating improved gradient index plastic optical articles.

SUMMARY OF THE INVENTION

One aspect of the present invention is based upon the discovery that a gradient index plastic optical article having excellent optical characteristics can be produced using a method of fabrication that incorporates a low refractive index dopant (i.e. having a refractive index lower than that of the polymer comprising the sheathing but without the dopant) in the sheathing of the article.

The present invention in another aspect relates to a gradient index plastic optical article, and methods of processing the article. The methods of the invention provide for the use of a significantly broader selection of dopant and polymeric materials which can be used to produce a functional gradient index plastic optical article with excellent optical characteristics. For example, the methods of the invention allow for control of the gradient refractive index of the material and for a wider range of differences in refractive indicies between the core and sheathing for a given concentration of core dopant thereby producing a gradient index plastic optical article with a low loss due to light attenuation and broad transmission bandwidth, having a high level of transparency, a substantial absence of bubbles and good environmental stability, for example, enhanced thermal stability and resistance to humidity.

One method for forming a gradient index plastic optical article according to the invention comprises the steps of: (a) forming a transparent tube of sheathing material including at least one sheathing polymer and at least one sheathing dopant; and (b) forming a transparent core within the sheathing tube produced in step (a) by: (i) filling the interior space of the sheathing tube with a core solution including at least one polymerizable core monomer which upon polymerization has a refractive index greater than that of the sheathing tube; and ii) allowing the polymerizable core monomer to polymerize thereby forming a polymeric core having a refractive index greater than that of the sheathing tube such that the article is suitable to conduct light at at least one wavelength with an attenuation less than 500 dB/km. The core solution can include an optional core dopant. When present, the core dopant will have a refractive index greater than that of the polymer obtained upon polymerization of a core monomer solution polymerized under the same conditions but not including the core dopant. The product thus obtained, is a gradient index plastic optical article having an outer sheathing and an inner core both at least partially transparent to light at at least one wavelength. The refractive index of the central axis of the core will be greater than that of the sheathing such that the article is suitable to conduct light at at least one wavelength with an attenuation less than about 500 dB/km, with the refractive index of the core preferably gradually decreasing in a radial direction from the central axis of the core to the periphery of the core at the core-sheathing interface. In general, the article is fabricated in the shape of a preform rod. Preferably, the preform rod has a cylindrical shape which can be drawn into fibers.

In one embodiment, the sheathing tube is made by extrusion methods. Alternatively, the sheathing tube can be produced by: (a) placing into a polymerization container a sheathing solution including at least one sheathing polymerizable monomer and at least one sheathing dopant, the sheathing dopant having a refractive index lower than that of the polymer obtained by the polymerization of a sheathing monomer solution under the same conditions but not including the sheathing dopant; and (b) causing the sheathing monomer of the sheathing solution to polymerize within the polymerization container into a cylindrical sheathing tube at least partially transparent to light at at least one wavelength. The invention further provides a method for forming a gradient index plastic optical fiber. In the method, the gradient index plastic optical article is prepared, for example as described above, in the shape of a preform rod which is then be subjected to hot-drawing at a predetermined temperature and speed suitable to produce a fiber useful as an optical conductor. In one embodiment, the monomer of the sheathing solution and the monomer of the core solution are the same. Suitable monomers include those which form polymers that are substantially amorphous and capable of conducting light at the desired wavelength(s). For embodiments where the core polymer and the sheathing polymer are the same, when a core dopant is used it will be different from the sheathing dopant.

In another aspect gradient index plastic optical articles of the invention comprise: (a) a polymeric sheathing that is at least partially transparent to light at at least one wavelength including at least one sheathing polymer and at least one sheathing dopant, where the sheathing dopant has a refractive index which is less than that of the sheathing polymer; and (b) a polymeric core, coaxially disposed within the sheathing, including at least one core polymer and having a refractive index at the central axis of the core greater than that of the polymeric sheathing. In some embodiments, the polymeric core further includes at least one core dopant, the core dopant, when present, having a refractive index which is greater than that of the core polymer. In preferred embodiments, the core dopant has a concentration gradient in a specific direction.

In some embodiments, the plastic optical article is in the shape of a cylindrical preform rod. In other embodiments, the article is in the shape of a cylindrical fiber having an outer diameter preferably between about 0.1 millimeter and about 1 millimeter.

In yet another aspect, the invention involves a gradient index plastic optical article with a polymeric sheathing and a polymeric core. The polymeric sheathing is at least partially transparent to at least one wavelength of light and includes a sheathing polymer and a sheathing dopant, where the sheathing dopant has a refractive index which is less than that of an equivalent polymeric sheathing without the sheathing dopant. The polymeric core of the article is polymerized within the sheathing, is at least partially transparent to at least one wavelength of light and includes a core polymer. The polymeric core also has a gradient in refractive index in a specific direction that is established by redistribution of a dopant during polymerization of a core solution including a polymerizable core monomer.

In another aspect, the invention provides a method for forming a gradient index plastic optical article. The method involves forming a tube of polymeric sheathing material that is at least partially transparent to at least one wavelength of light from at least one polymerizable sheathing monomer and a sheathing dopant. A polymeric core that is at least partially transparent to at least one wavelength of light is then formed within the tube by filling the tube with a composition including at least one polymerizable core monomer and polymerizing the monomer. The polymeric core thus formed has a gradient in refractive index in a specific direction.

The invention also involves a gradient index plastic optical article which has a polymeric sheathing that includes a sheathing dopant.

In another aspect, the invention involves a gradient index plastic optical article with a polymeric sheathing and a polymeric core. The polymeric sheathing is at least partially transparent to at least one wavelength of light and includes a sheathing polymer. The polymeric core of the article is polymerized within the sheathing, is at least partially transparent to at least one wavelength of light and includes a core polymer and a specific overall concentration of a core dopant that has a refractive index greater than that of the core polymer. Furthermore, the core dopant has a concentration gradient within the core in a specific direction that is established by redistribution of the core dopant during polymerization of a core solution including a polymerizable core monomer. The polymeric sheathing of the article is constructed and arranged so that the difference in refractive indices between the central axis of the polymeric core and the polymeric sheathing exceeds the difference in refractive indices between the central axis of the polymeric core and the sheathing polymer.

In one aspect, the invention involves a gradient index plastic optical article with a polymeric sheathing and a polymeric core. The polymeric sheathing is at least partially transparent to at least one wavelength of light and includes a sheathing polymer. The polymeric core of the article is coaxially disposed within the sheathing, is at least partially transparent to at least one wavelength of light and includes a core polymer and a core dopant that has a refractive index greater than that of the core polymer. The core dopant is present in the polymeric core at a first overall concentration sufficient to create a difference in refractive indices between the central axis of the core and the sheathing of a desired value. In addition, the core dopant has a concentration gradient within the core in a specific direction. The polymeric sheathing of the article is constructed and arranged so that the maximum service temperature of the article exceeds that of an equivalent article except having a sheathing comprised of only sheathing polymer and having a second overall core dopant concentration required to create a difference in refractive indices between the central axis of the core and the sheathing equal to the same desired value. In general, this increase in the permissible service temperature for articles manufactured according to the present invention having a particular difference in refractive indices between core and sheathing is enabled by the ability to use a lower amount of core dopant in order to create the desired difference in refractive indices.

In yet another aspect, the invention involves a gradient index plastic optical article with a polymeric sheathing and a polymeric core. The polymeric sheathing is at least partially transparent to at least one wavelength of light and includes a sheathing polymer. The polymeric core of the article is coaxially disposed within the sheathing, is at least partially transparent to at least one wavelength of light and includes a core polymer and a core dopant that has a refractive index greater than that of the core polymer. The core dopant is present in the polymeric core at a first overall concentration sufficient to create a difference in refractive indices between the central axis of the core and the sheathing of a desired value. Furthermore, the core dopant has a concentration gradient within the core in a specific direction. The polymeric sheathing of the article is constructed and arranged so that at least one wavelength of light is conducted by the article with less attenuation than by an equivalent article except having a sheathing comprised of only sheathing polymer and having a second overall core dopant concentration required to create a difference in refractive indices between the central axis of the core and the sheathing equal to the same desired value.

In one aspect, the invention involves an optical preform article. The preform includes a polymeric sheathing, which is at least partially transparent to at least one wavelength of light and has a refractive index of a first value at that wavelength. The polymeric sheathing includes a sheathing polymer and a plasticizer. The preform also includes a polymeric core, which includes a core polymer, that is polymerized within the sheathing and is at least partially transparent to the same wavelength(s) of light as the polymeric sheathing, and which has a refractive index of a second value at the central axis of the core at that wavelength. The preform is fabricated so that the second value of refractive index (i.e. at the central axis of the polymeric core) exceeds the first value (i.e. of the sheathing).

In another aspect, the invention involves a method for making a plurality of optical preform articles. The method involves forming a plurality of polymeric sheathings, each of which includes a sheathing polymer, is at least partially transparent to at least one wavelength of light, and has a refractive index of a first value at that wavelength. The method also involves forming a plurality of polymeric cores, each of which includes a core polymer, that is coaxially disposed within the sheathing and is at least partially transparent to the same wavelength(s) of light as the polymeric sheathing, and which has a refractive index of a second value at the central axis at that wavelength that exceeds the first value of the sheathing. The region of contact between the sheathings and the cores thus formed defines a plurality of interfaces, with essentially all of the plurality of interfaces being essentially free of visible bubbles. In other words, the invention enables a large number of preforms to be made, each of which is essentially free of visible bubbles along its entire "as polymerized" length (e.g. without cutting the preform after polymerization).

In another embodiment, the invention involves an optical preform article. The preform includes a polymeric sheathing, which includes a sheathing polymer, that is at least partially transparent to at least one wavelength of light and has a refractive index of a first value at that wavelength. The preform also includes a polymeric core that is coaxially disposed within the sheathing and is at least partially transparent to the same wavelength(s) of light as the polymeric sheathing, and which has a refractive index of a second value at the central axis of the core at that wavelength that exceeds the first value of the sheathing. The polymeric core includes a core polymer and a core dopant having a refractive index which is greater than that of the core polymer. The core dopant is present in the polymeric core at a specified overall concentration. Furthermore, the preform is constructed and arranged to be formable into an optical fiber that conducts light at the above mentioned wavelength(s) with an attenuation of less than 500 dB/km, with the specified overall core dopant concentration not exceeding 7.9% wt.

In another aspect, the invention involves a plastic optical article. The article comprises a polymeric sheathing, which is at least partially transparent to at least one wavelength of light and a polymeric core, polymerized within the sheathing, which is also at least partially transparent to the same wavelength of light. The polymeric sheathing includes a sheathing polymer, and the polymeric core includes a core polymer and a core dopant that has a refractive index greater than that of the core polymer. The refractive index of the central axis of the polymeric core has a value at the wavelength of light mentioned above that exceeds the refractive index of the polymeric sheathing at the same wavelength by at least 0.01. Furthermore, the maximum service temperature of the article is at least 40 degrees C., preferably 45 degrees C., and more preferrably 50 degrees C.

In yet another aspect, the invention provides a method for making a gradient plastic optical fiber. The method involves first forming a polymeric preform rod comprising a polymeric sheathing and a polymeric core coaxially disposed within the sheathing that has a gradient in refractive index in a specified direction. The preform is then hot-drawn at a rate of at least 3 m/min, preferably at least 4 m/min, and more preferably, at least 5 m/min, into a fiber. The fiber thus produced conducts at least one wavelength of light with an attenuation less than 500 dB/km.

DETAILED DESCRIPTION OF THE INVENTION

Figure 1:
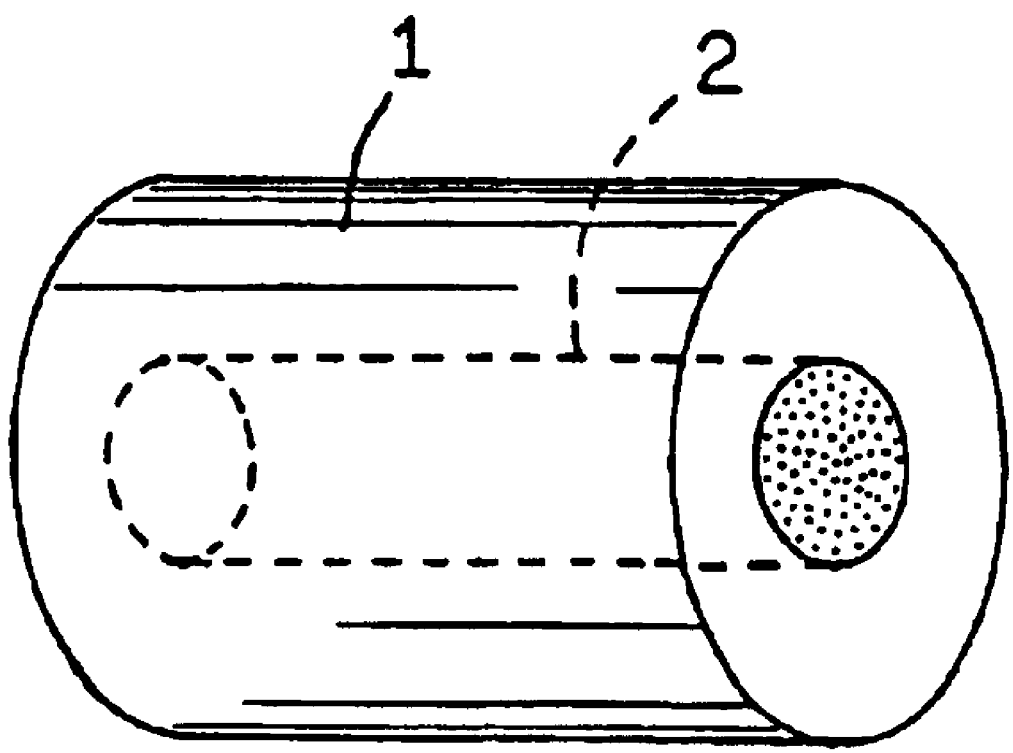
FIG. 1 shows one embodiment of a gradient index plastic optical article according to the invention.

The features and other details of the invention will now be more particularly described and pointed out in the detailed description and examples below. It will be understood that the particular embodiments of the invention are shown by way of illustration only and are not intended to act as limitations of the invention. The principle features of this invention can be employed in various embodiments not specifically described herein without departing from the scope of the invention.

In one aspect, the invention provides a method for forming a gradient index plastic optical article including the steps of: (a) forming a tube of polymeric sheathing material that is at least partially transparent to light at at least one wavelength by: (i) placing into a polymerization container a sheathing solution including at least one polymerizable sheathing monomer and a plasticizer and/or dopant; and (ii) causing the sheathing monomer of the sheathing solution to polymerize within the polymerization container to form a polymeric sheathing tube at least partially transparent to light at at least one wavelength; and (b) forming a polymeric core coaxially disposed within the polymeric sheathing tube produced in step (a) by: (i) filling the interior space of the sheathing tube with a core solution including at least one polymerizable core monomer, which upon polymerization produces a polymeric core which has a refractive index greater than that of the polymeric sheathing tube; and (ii) allowing the core polymerizable monomer to polymerize. The core solution can further include a core dopant. When present, the core dopant will have, for most embodiments, a refractive index greater than that of the polymer obtained upon polymerization of the core monomer (i.e. without addition of the dopant).

In other aspects of the invention, the dopant included in the polymeric sheathing acts as a plasticizer, thus improving the mechanical properties of the polymeric sheathing. In other embodiments, a plastizer which does not provide a desireable dopant effect but which yields desirable mechanical properties may be used, or a dopant which does not act as a plasticizer may be used, or a combination of a dopant and a plasticizer may be used. In some preferred embodiments, the plasticizer added to the sheathing further can act as a dopant which raises or lowers the refractive index of the polymeric sheathing when compared to polymerized sheathing monomer not including the plasticizer. For embodiments involving conducting light within a rod or fiber fabricated according to the invention, preferably the sheathing dopant lowers the refractive index of the polymeric sheathing.

The terms "polymeric sheathing" and "polymeric core" as used herein refer to the polymerized sheathing and core solutions respectively, which include the polymerized sheathing and core monomers respectively (along with any agents involved with the polymerization reaction such as iniatiators, and chain transfer agents); plus, any added plasticizers and/or dopants, which do not participate in the polymerization reaction of the monomers. The terms "sheathing polymer" and "core polymer" as used herein, refer to the polymerized sheathing and core monomers respectively (along with any agents involved with the polymerization reaction such as iniatiators, and chain transfer agents), except polymerized without any plasticizers and/or dopants, which do not participate in the polymerization reaction of the monomers. "Sheathing polymer" and "core polymer" as used herein, may include homopolymers, copolymers, mixtures of homopolymers, mixtures of copolymers, mixtures of homopolymers and copolymers, and the like. A "dopant" as used herein, refers to any material or mixture of materials, which does not participate in the polymerization reaction and which is not covalently incorporated into the polymeric structure, but which has at least limited miscibility within the structure, so that when present, it alters the effective refractive index of the polymeric structure versus the refractive index of an equivalent polymer, but not containing the dopant, by at least 0.0001. A "plasticizer" as used herein, refers to any material or mixture of materials, which does not participate in the polymerization reaction and is not covalently incorporated into the polymeric structure, but which has at least limited miscibility within the structure, so that when present, it decreases the glass transition temperature of the polymeric structure versus that of an equivalent polymer, but not containing the plasticizer, by at least 1%. It should also be understood that "plasticizers" and "dopants" as used herein also can include unreacted monomer, or unreacted agents typically used in conjunction with a polymerization reaction such as unreacted iniatiators, and unreacted chain transfer agents. Suitable dopants or plasticizers may be solids, liquids, or gases at room temperature and pressure.

The phrase "transparent" or "at least partially transparent" as used herein, refers to the ability transmit or conduct a finite quantity of light energy (greater than zero) of at least one wavelength, over a finite, non-zero, distance. The term "coaxially" or "coaxial" as used herein to describe the structure of certain optical articles according to the invention, refers to an elongated cylindrical core having a central longitudinal axis, which is concentrically surrounded by, and in at least partial physical contact with, an outer annular sheathing, which shares the central longitudinal axis with the core, and is physically and/or chemically distinct from the core. The region of contact between the core and the sheathing is herein referred to as an "interface."

Preferred products obtained by the methods of the invention include gradient index plastic optical articles having an outer transparent polymeric sheathing layer and an inner transparent polymeric core. The refractive index of the core is greater than that of the sheathing such that the article is suitable to conduct light, with the refractive index of the core having a gradient in a specific direction. The term "refractive index" as used herein, refers specifically to the refractive index of the material at the wavelength, or wavelengths, of light being transmitted. When there may exist more than one index of refraction at a given wavelength within a material depending on the spatial location within the material where the index is measured, unless a specific spatial location is specified, the term "index of refraction" refers to the maximum index of refraction within the material. The phrase "gradient in a specific direction" as used herein, refers to a continuous change in a property in a radial direction either from the central axis to the periphery or vice versa. For preferred optical articles according to the invention, the core has a gradient in refractive index such that the refractive index is highest at the central axis of the core and decreases in the direction of the interface between the core and sheathing. However in other specific embodiments, the gradient may be in the opposite direction. In general, the articles are initially produced in the shape of a preform rod, as shown in FIG. 1, where the transparent sheathing is depicted as component 1 and the core is depicted as component 2. Preferably, the preform rod has a circular cylindrical shape. The methods of the present invention also provide for forming a gradient index plastic optical fiber, preferably with an outer diameter not more than 1 millimeter and with the same general cylindrical shape of the preform but with a smaller diameter. To form an optical fiber from a preform rod, the preform can be subjected to hot-drawing at a temperature and speed suitable to render the fiber useful as an optical conductor. The novel addition of a plasticizer to the polymeric sheathing according to one aspect of the invention, provides improved mechanical properties of the preform article which enable faster hot-drawing speeds than previously attainable. For example, preforms, according to the invention, may be formed into an optical fiber able to conduct light at at least one wavelength with an attenuation less than 500 dB/km, and preferably less than 200 dB/km, by hot drawing at a drawing speed of at least 3 m/min, preferably at least 4 m/min, more preferably at least 5 m/min, and even more preferably at least 6 m/min. Alternatively, instead of formation of the optical fiber by hot drawing, the fiber may be produced by extrusion.

The term "preform rod" as used herein, refers to a rod shaped gradient index plastic optical article that can subsequently be processed into an optical conductor such as an optical fiber, an optical waveguide, or an optical integrated circuit.

The polymerization container used in the method of the invention can be composed of any material which is inert to the sheathing solution, for example, glass. The container shape and dimensions will determine the outer shape of the gradient index plastic optical preform article ultimately obtained by the method. The sheathing tube can be produced by using the well known technique of rotation casting, by placing a sheathing solution in the polymerization container and causing the solution to polymerize within the container while the container is rotated to yield an annular cylindrical shape. Thus, the polymerization container can be any shape which when rotated about its own axis creates a sheathing tube with an annular cylindrical shape. The preferred shape of the container is a circular cylinder preferably with dimensions suitable for hot-drawing into an optical fiber, for example, with an inner diameter between 0.25 and 2 inches (0.64 and 5.1 cm). The centrifugal force resulting from the rotation of the polymerization container will cause the resulting polymer to form a tube of sheathing material or a sheathing tube within the polymerization container. Rotation can be accomplished, for example, by spinning the container.

The amount of sheathing-forming solution placed in the polymerization container can be determined based upon the ratio of the thickness of the sheathing wall to the distance between the opposing interior walls of the sheathing which is desired. This ratio will depend upon the cost of materials and the end use of the optical article.

Alternatively, the sheathing can also be prepared by extrusion of the sheathing polymer, together with any additives such as plasticizers and/or dopants, into tubular shapes using extrusion methods which are well known to those of skill in the art. The outer and inner shape of the sheathing using this method will be dictated by the shape of the extrusion dye. The extruded sheathing will then serve as the container into which the core-forming solution will be added and allowed to polymerize.

The polymerizable sheathing monomer can be any monomer or mixture of monomers which upon polymerization yields substantially amorphous and transparent polymeric materials. Preferably, the polymeric materials of the sheathing are at least partially soluble in the monomer present in the core-forming solution and exhibit a suitable miscibility with the sheathing dopant and/or plasticizer.

Polymerizable monomers suitable for use in this invention include, but are not limited-to, for example, methacrylate monomers such as branched and unbranched $C_1$-$C_{10}$ alkyl methacrylates, for example, methyl methacrylate, ethyl methacrylate, n-propyl methacrylate, n-butyl methacrylate, n-hexyl methacrylate, isopropyl methacrylate, isobutyl methacrylate, tert-butyl methacrylate; halogenated methacrylates, such as 2,2,2-trifluoroethyl methacrylate; 4-methyl cyclohexyl methacrylate, cyclohexyl methacrylate, furfuryl methacrylate 1-phenylethyl methacrylate, 2-phenylethyl methacrylate, 1-phenylcyclohexyl methacrylate, benzyl methacrylate and phenyl methacrylate; acrylate monomers such as, methyl acrylate, ethyl acrylate, n-butyl acrylate, benzyl acrylate, 2-chloroethyl acrylate, methyl-α-chloro acrylate, 2,2,3,3-tetrafluoropropyl-α-fluoro acrylate, and 2,2,2-trifluoroethyl acrylate; acrylonitrile and α-methylacrylonitrile; vinyl monomers, such as vinyl acetate, vinyl benzoate, vinyl phenylacetate, vinyl chloroacetate; styrene monomers, such as styrene, halogenated styrenes, for example, o-chlorostyrene, p-fluorostyrene, o,p-difluorostyrene, and p-isopropyl styrene; and perfluorinated monomers such as those disclosed in European Patent Application EP 0710 855 herein incorporated by reference. Such monomers include, but are not limited to perfluoro(2,2-dimethyl-1,3-dioxole) (PDD), perfluoro(allyl vinyl ether), perfluoro(butenylyl vinyl ether) and any combination of monomers thereof. When a combination of monomers is employed polymerization will result in formation of a copolymer.

Figure 2:
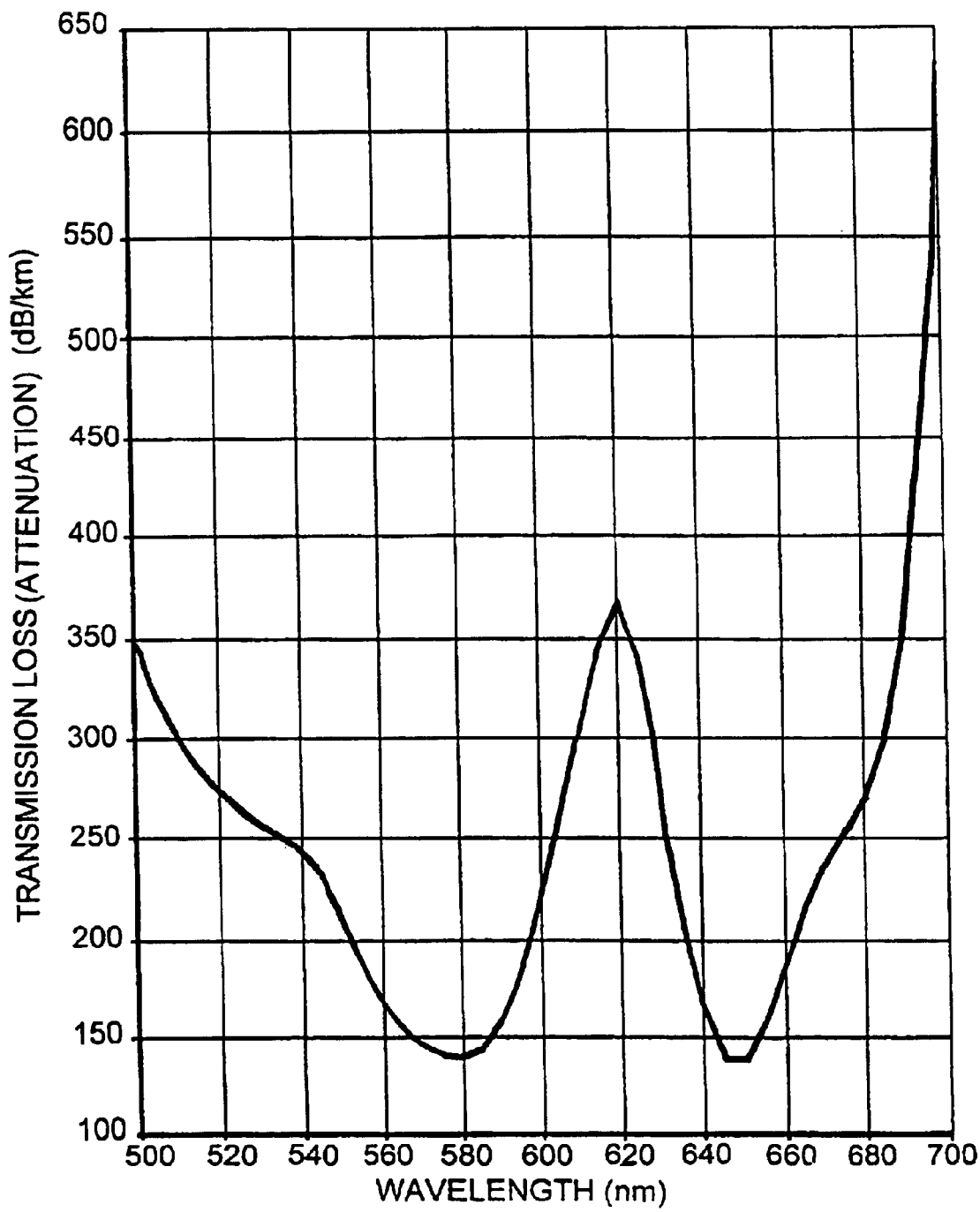
FIG. 2 is a graph showing the relationship between the transmission loss (attenuation) and wavelength of light for an optical fiber according to the invention; transmission loss at 650 nm was approximately 140 dB/km demonstrating that the optical fiber had a high level of transparency.

A sheathing plasticizer or dopant suitable for use in the methods of the invention is one which does not participate in the chemical reaction which polymerizes the sheathing monomer. A preferred sheathing dopant will have a refractive index which is lower than that of the sheathing polymer obtained upon polymerization of sheathing monomer in a manner essentially identical to that employed for forming the polymeric sheathing except without the presence of the dopant. In other words, the sheathing dopant is selected so that the polymeric sheathing containing the sheathing dopant will have a lower refractive index than an equivalent polymeric sheathing except without the sheathing dopant by at least 0.0001, and preferably by at least 0.0005. In addition, the sheathing dopant should not unduly reduce the degree of transparency of the polymeric sheathing obtained upon polymerization of the sheathing solution. The level of transparency is inversely related to the transmission loss (i.e. attenuation) of a gradient index plastic optical conductor at the operating wavelength of the conductor, and can be assessed using techniques well known to those of skill in the art. For example, a gradient index plastic optical fiber which has a transmission lose value of 110 dB/km at an operating wavelength of 650 nm, possesses an adequate level of transparency as an optical conductor. However, a loss of more than 500 dB/km would not be an acceptable level of transparency. Therefore, a gradient index optical article is suitably transparent when an optical conductor, prepared from the article, has a transmission lose, also known as the attenuation, for the operating wavelength of the conductor less than 500 dB/km. FIG. 2 depicts the transmission loss of an optical fiber prepared using the method of the invention as described herein in Example 1. The loss was measured using methods known in the art such as those described in "Test Method for Attenuation of All Plastic Multimode optical Fibers JIS C 6863-(1990)," *Japanese Industrial Standard* by the Japanese Standards Association, herein incorporated by reference. FIG. 2 shows a transmission loss of 140 dB/km at a wavelength of 650 nm.

One useful criterion, for predicting whether or not the sheathing will be sufficiently transparent, is predicated on the Flory-Huggins interaction parameter $\chi_{AB}$. That is, $\chi_{AB}$ can be used as a guide to the degree of miscibility between substances A and B, which in this case would be sheathing polymer and sheathing plasticizer and/or dopant. The blend miscibility can be assumed to decrease with increasing values of $\chi_{AB}$. This parameter can be determined experimentally or approximated according to the following equation:

$$\chi_{AB} = \frac{V_{ref}(\delta_A - \delta_B)^2}{RT}$$

where Δ is the solubility parameter which is a thermodynamic quantity generally defined as the square root of the cohesive energy density (the cohesive energy density is obtained by dividing the molar evaporation energy, ΔE, of a liquid by a molar volume, V), $V_{ref}$ is an appropriate reference volume, R is the ideal gas constant and T is the temperature in degrees K. A detailed discussion of the Flory-Huggins interaction parameter can be found in *CRC Handbook of Polymer-Liquid Interaction Parameters and Solubility Parameters*, by A. F. M. Barton, 1990, herein incorporated by reference. Flory-Huggins interaction parameters below about 0.5 generally indicate that a dopant or plasticizer may have suitable miscibility for use in the invention. However, the Flory-Huggins interaction parameter should be used only as a guide to the selection of an appropriate dopant or plasticizer, but not as a limitation, since the concentration of the plasticizer or dopant is also important in determining the transparency of the polymeric sheathing and core.

Some examples of preferred sheathing dopants suitable for use in the invention include, but are not limited to, diisobutyl adipate, glycerol-triacetate, 2,2,4-trimethyl-1,3-pentanediol diisobutyrate, methyl laurate, dimethyl sebatate, isopropyl myristate, diethyl succinate, diethyl phthalate, tributyl phosphate, dicyclohexyl phthalate, dibutyl sebatate, diisooctyl phthalate, dicapryl phthalate, diisodecyl phthalate, butyl, octyl phthalate, dicapryl adipate, perfluorinated aromatics, for example perfluoro naphthalene, perfluorinated ethers and perfluorinated polyethers. Preferably, the sheathing dopant is present in the sheathing at an overall concentration of between about 1 and about 35 weight percent based on the total weight of the polymeric sheathing, more preferably between about 1 and about 20 weight percent, and most preferably between about 1 and about 15 weight percent. In general, preferred sheathing dopants can also impart plasticizer-like qualities and/or hydrophobic properties to the polymeric sheathing. The presence of plasticizer-like qualities and/or hydrophobic properties in the polymeric sheathing of the invention is advantageous. That is, plasticizer-like qualities allow the gradient index plastic optical article to be hot-drawn at a lower temperature and a higher speed, and also can result in a fiber with a lower level of attenuation or transmission loss compared to prior art fibers and methods. Hydrophobic properties provide for an optical article with enhanced environmental stability, for example decreased moisture absorbency.

It should be emphasized that, in some embodiments, a plasticizer can be used to impart the desirable physical properties above that does not impart desired refractive index changes to the polymer. Such a plasticizer may advantageously be used alone when changes in refractive index are not needed or desired, or, in other embodiments, such plasticizers may be used together with a separate dopant. Any suitable plasticizer known in the art useful for plasticizing the polymers formed from the polymerizable monomers previously listed may potentially be employed in the present invention.

Suitable methods of polymerization for forming the gradient index plastic optical article according to the invention include, for example, free radical polymerization, atom transfer radical polymerization, anionic polymerization and cationic polymerization. Free radical bulk polymerization, employing either thermal or optical energy, is preferred.

When radical polymerization is employed, the sheathing solution also includes a radical polymerization initiator and a chain transfer agent which participate in the polymerization reaction. Suitable radical polymerization initiators are selected based on the type of energy employed in the polymerization reaction. For example, when heat or infrared energy is employed, peroxides such as lauryl peroxide, benzoyl peroxide, t-butyl peroxide and 2,5-dimethyl-2,5-di (2-ethyl hexanoyl peroxy)hexane (TBEC) are suitable for use. When ultraviolet light energy is employed benzoin methyl ether (BME) or benzoyl peroxide is suitable for use. Typically, the polymerization initiator is present in the sheathing solution in a range of between about 0.1 to about 0.5 percent by weight.

Chain transfer agents suitable for use in the method of the invention include, but are not limited to, 1-butanethiol and 1-dodecanethiol. Typically, the chain transfer agent in present in the sheathing solution below about 0.5 percent by weight.

As described earlier, the polymerization container is rotated during polymerization of the monomer of the sheathing solution. This rotation, for example spinning, will yield a transparent sheathing tube having an annular cylindrical configuration. The interior space of this sheathing tube thereby provides a suitable container for polymerization of the core monomer in a subsequent step of the inventive method.

The core of the gradient index plastic optical article is the inner layer of the material which is disposed within the sheathing. The core is transparent and is the component of the article through which most of the light travels. The refractive index of the central axis of the polymeric core is preferably greater than that of the sheathing, and more preferably, the index of refraction throughout the bulk of the core is greater than that of the polymeric sheathing.

The core can be prepared by filling the sheathing tube with a core solution (which includes a polymerizable core monomer and, optionally, a core dopant), and polymerizing the core monomer in the solution. The polymerizable core monomer can be any monomer or mixture of monomers which upon polymerization yields substantially amorphous and transparent polymeric materials capable of conducting light at the desired wavelength. In addition, the polymeric core, once formed, preferably has a refractive index at its central axis greater than that of the sheathing such that the final optical article is suitable to conduct light. All of the monomers which are suitable for use in preparing the sheathing are, likewise, suitable for use in preparing the core.

Any method of polymerization previously described as suitable for formation of the polymeric sheathing is also suitable for formation of the polymeric core. When radical polymerization is employed in preparation of the core a polymerization initiator and chain transfer agent is present in the core solution with a concentration similar to that described earlier for the sheathing.

An optional core dopant suitable for use is one which does not participate in the chemical reaction which polymerizes the core monomer and which preferably has a boiling point lower than the highest processing temperature to which it is subjected. A suitable core dopant will preferably have a refractive index which is greater than that of the core polymer obtained upon polymerization of a core monomer solution without the core dopant. In addition, preferred core dopants should not unduly reduce the transparency of the polymeric core. As in the preparation of the sheathing, one useful criterion for predicting whether or not the core will be sufficiently transparent is predicated on the Flory-Huggins interaction parameter between the core polymer and the core dopant. However, as discussed earlier this parameter should be used only as a guide when choosing a suitable core dopant, since the concentration of the dopant also affects the polymeric core transparency.

Compounds suitable for use as the core dopant in the method of the invention include, but are not limited to, dibenzyl ether, phenoxy toluene, 1,1-bis-(3,4-dimethyl phenyl) ethane, diphenyl ether, biphenyl, diphenyl sulfide, diphenylmethane, benzyl phthalate-n-butyl, 1-methoxyphenyl-1-phenylethane, benzyl benzoate, bromobenzene, o-dichlorobenzene, m-dichlorobenzene, 1,2-dibromomethane, 3-phenyl-i-propanol, dioctyl phthalate and perfluorinated aromatics, such as, perfluoro naphthalene.

When the core solution, which includes the core monomer and an optional core dopant, is added to the sheathing tube, the inner surface of the sheathing tube is slightly swollen by the core monomer. During the polymerization, a gel phase is formed in the polymerizing core adjacent to the inner wall of the sheathing tube which gradually moves toward the central axis as the polymerization process progresses. Since the diffusivity of the core dopant is higher in the unpolymerized core solution than in the gel phase or the polymerized regions of the core, there is a net migration of core dopant towards the central axis of the core during the polymerization, so that when polymerization is complete, there is a concentration gradient of core dopant in the direction from the central axis (highest concentration) towards the interface with the sheathing (lowest concentration). In contrast, the sheathing dopant, some of which can elute from the sheathing and diffuse into the core during polymerization, will have a concentration within the polymerized core which is highest at the core-sheathing interface and which gradually decreases with distance from the interface towards the central axis of the core. Thus, a concentration gradient of the low refractive index sheathing dopant is formed in the gel phase during polymerization due to diffusion of sheathing dopant from the polymeric sheathing. The polymerization front in the core starts from the vicinity of the inner surface of the sheathing (interface between sheathing and core) and gradually moves towards the center axis of the core due a phenomena of accelerated polymerization in the gel phase commonly known as the "gel-effect" (For additional details, see for example, Koike, Y. et al., "High-Bandwidth Graded-Index Polymer Optical Fiber", *Journal of Lightwave Technology*, 230): 1475–1489 (1995) and Koike, Y. et al., "New Interfacial-Gel Copolymerization Technique for Steric GRIN Polymer Optical Waveguide and Lens Arrays", *Applied Optics*, 27(3): 486–491 (1988), both incorporated herein by reference).

As discussed above, when a core dopant, having a higher refractive index than the equivalent polymerized core monomer but without the core dopant, is present, a concentration gradient of the core dopant, within the polymeric core, is formed. As described in U.S. Pat. No. 5,541,247 by Koike, incorporated herein by reference, the core monomer polymerizes while the substance with a greater refractive index (core dopant) becomes concentrated towards the central axis of the core. The high concentration of the core dopant which is present at the central part of the core gradually decreases in a radial direction toward the periphery, thereby, creating a gradient in core dopant concentration in a specific direction which creates a corresponding gradient in refractive index within the core. Notably, the specific direction of the concentration gradient of core dopant within the polymeric core will be opposite that of the concentration gradient of the sheathing dopant within the core.

In certain embodiments, the polymerizable monomer of the sheathing solution and the polymerizable monomer of the core solution are the same. In such cases, suitable monomers include those which form polymers that are substantially amorphous and transparent, thereby being capable of conducting light at the desired wavelength, as earlier described. When the sheathing and core monomers are the same, and a core dopant is present, the sheathing dopants and core dopants will be different. That is, the sheathing dopant will have a refractive index which is less than that of the polymer obtained upon an equivalent polymerization of a sheathing monomer solution without the sheathing dopant, while the core dopant will have a refractive index which is greater than that of the polymer obtained upon an equivalent polymerization of a core monomer solution without the core dopant. Preferably, the difference in refractive index between the sheathing dopant and core dopant should have a value which renders the optical article suitable to conduct light at at least one wavelength with an attenuation less than 500 dB/km.

Advantageously, through use of a low refractive index sheathing dopant according to one aspect of the invention, the overall concentration of core dopant required to provide a desired difference in refractive index between the central axis of the core and the sheathing will be less than for an equivalent optical article except having a sheathing which does not include the sheathing dopant. The term "overall concentration" as used herein, refers to the total amount of core dopant present in the polymeric core based on the total weight of the polymeric core. In short, the current invention provides plastic optical articles which require a lower overall concentration of core dopant to obtain comparable bandwidth capabilities when compared to similar prior art optical articles. The ability to use a lower overall core dopant concentration provides many advantages in the optical and physical properties of the articles as discussed below. As an example, if a desired difference in the refractive index between the central axis of the core and the sheathing is 0.001, this could be achieved according to the present invention, for example, by employing a core dopant which raises the refractive index the polymeric core by 0.0005 and a sheathing dopant which lowers the refractive index of the polymeric sheathing by 0.0005. The use of a low refractive index sheathing dopant according to the invention enables the fabrication of plastic optical articles having an unprecedented difference in the refractive indices of the central axis of the core and the sheathing. For example, according to the inventive methods, using a particular selection of dopants, a plastic optical preform can be fabricated with the difference in the refractive indices between the central axis of the core and the sheathing being at least 0.01 with an overall core dopant concentration not exceeding 12% wt.

Thus, the method of the invention employing sheathing dopants has advantages over a method employing a dopant-free sheathing, in that for example, a broader selection of materials which can employed as dopants is available, based on the additive effect of the core and sheathing dopant as opposed to the singular effect of a core dopant alone. Additionally a lower concentration of core dopant or no dopant at all can be used in the core while still achieving a suitable difference in refractive indices. A reduction in the required concentration of core dopant can, for example, increase the transparency of the article and reduce attenuation when compared to an equivalent article except having a sheathing without the sheathing dopant, such article thus requiring a higher overall concentration of core dopant to create the same difference in refractive index between the central axis of the core and the sheathing. "Equivalent" as used herein in this context implies that all materials and polymerization conditions are the same for the articles being compared except for the presence of a dopant or plasticizer. The reduction in core dopant concentration enabled by the present invention can also allow for an increased maximum service temperature for the article, since lower core dopant concentrations will typically correlate with higher glass transition temperatures for the polymeric cores. For example, the present invention can provide a plastic optical article comprising a polymeric sheathing and a polymeric core where the refractive index at the central axis of the core exceeds that of the sheathing (for the same wavelength) by at least 0.01, while the article has a maximum service temperature of at least 40 degrees C.

In a specific preferred embodiment, the monomer that is polymerized to form the core and the sheathing is methyl methacrylate. In another preferred embodiment, the monomer that is polymerized to form the core and the sheathing is a perfluorinated monomer such as perfluoro(2,2-dimethyl-1,3-dioxole) (PDD). In these embodiments, when a core dopant is present, the sheathing plasticizer and/or dopant and core dopant are preferably different substances. For embodiments where the sheathing includes a sheathing dopant, the difference in the refractive index between the dopants should be such that the optical article is suitable to conduct light at the desired wavelength. Additionally, for such embodiments, the refractive index of the core dopant is preferably greater than that of the sheathing dopant. For example, when the core polymer and sheathing polymer are poly(methyl methacrylate), the dopant for the sheathing could be tributyl phosphate (refractive index=1.424) while the dopant for the core could be diphenyl sulfide (refractive index=1.6327). Other preferred embodiments where the sheathing and the core include the same polymerized monomer, for example a perfluorinated monomer, utilize different sheathing and core dopants where both dopants are perhalogenated.

A significant advantage of the methods of the invention include the availability of a significantly broader range of dopant and monomer materials which are useful in preparing the inventive gradient index plastic optical articles. This increase in the range and types of materials suitable for use in the invention provides, for example, the ability to increase the difference in the refractive indices between the sheathing and the core without unduly compromising the performance characteristics of the optical article, and, in some cases, the ability to widen the operating wavelength range of the articles. This is particularly important when the articles are employed in data communications applications. In addition, the concentration of dopant in the core, necessary to provide the required difference in refractive indices, can be decreased when a sheathing dopant, which lowers the refractive index of the polymeric sheathing, is present. This decrease in the required concentration of the core dopant can significantly improve the miscibility of the core dopant materials which directly impacts the optical characteristics, for example, transparency of the optical article. Furthermore, the sheathing dopant, in many instances, will also behave as a plasticizer. Plasticizers, including plasticizing dopants, can enable hot-drawing of the preform article according to the invention into, for example, an optical fiber at a lower temperature and/or higher drawing speed as previously discussed.

Plasticizers, including plasticizing dopants, also provides advantages when forming the optical preform article during polymerization. In typical prior art methods not employing a sheathing plasticizer, when the core monomer is polymerized within the sheathing tube, the core has a tendency to shrink in a radial direction as polymerization proceeds. This results in the polymeric core separating from the sheathing during the polymerization causing the formation of bubbles at the interface between the sheathing and the core for a significant fraction of the articles produced. These bubbles are very detrimental to the optical performance of the article, and normally are cut out of the article, thus reducing its length, or the article containing the bubbles is simply discarded. With the present invention, the sheathing plasticizer can soften the polymeric sheathing, by lowering the glass transition temperature, an effective amount so that the sheathing will remain in contact with the core to a greater extent during core polymerization. In this way, the quantity of bubbles formed at the interface can be markedly reduced. Specifically, the present invention provides a method for the consistent production of plastic optical articles, each having an interface between the polymeric sheathing and polymeric core that is essentially free of visible bubbles. The mechanical property advantages of including dopants and/or plasticizers in the sheathing are not limited to applications involving gradient index plastic optical articles. Similar advantages, for example an increase in permissable drawing speed, may be realized for step-index plastic optical articles, plastic optical lenses, plastic optical waveguides, and plastic optical integrated circuits.

The invention will now be further illustrated by the following examples which are not intended to limit the scope of the invention in any way. All percentages are by weight unless otherwise specified.

EXAMPLE 1

Preparation of Sheathing

A sheathing solution containing 1600 g (92.2% wt) of purified methyl methacrylate (MMA), 4.00 g (0.23% wt) of lauryl peroxide as the polymerization initiator, 3.42 ml of 1-butanethiol (0.17% wt) as the chain transfer reagent (available from Aldrich Chemical Co., Inc.. Milwaukee, Wis.) and 128 g of dicyclohexyl phthalate (7.4% wt) as the sheathing dopant was stirred and degassed for about 30 minutes.

To an appropriately stoppered glass tube, having an inner diameter of 30 mm and a length of 1.5 meters was added sheathing solution, to a height of 1 meter to achieve a final ratio of core to sheathing thickness of about 2:3. In general, a final ratio of the thickness of the sheathing wall to core thickness can be between about 1:4 to about 2:1. Both ends of the tube were sealed, and then the tube was placed in a water bath at a temperature of 71 degrees C. and polymerized while being rotated at approximately 500 rpm for 20 hours. The tube was then placed in a rotating oven (approximately 5 rpms) for two hours at 100 degrees C. A polymeric sheathing tube was thus obtained.

Preparation of Core

The sheathing prepared above was kept in the glass tube, and the container formed by the cylindrical inner surface of the sheathing was filled with a solution containing 350 g (92.1 % wt) of MMA, 200 microliters of t-butyl peroxide 600 microliters of 1-dodecanethiol and 30 grams(7.9% wt) of diphenyl sulfide as the core dopant. The tube was sealed and then heated in a vertical position at 90 degrees C. for 24 hours. The tube was then placed in the oven horizontally and heated for 12 hours at 90 degrees C., 24 hours at 110 degrees C., 10 hours at 120 degrees C. and 4 hours at 130 degrees C. while rotating at a speed of 5 rpm.

The gradient index plastic optical preform rod was then removed from the glass polymerization container. The rod was then slowly inserted into a cylindrical heating furnace from the top while the furnace was maintained at a temperature between 180 degrees C. and 220 degrees C. When the rod was softened sufficiently, hot-drawing and spinning into an optical fiber at a constant speed of approximately 15 m/min was started from the bottom of the rod.

EXAMPLE 2

Preparation of Sheathing

A polymeric sheathing was prepared as in Example 1 above, except that the sheathing solution contained 320 g (16.6% wt) of dicyclohexyl phthalate as the sheathing dopant.

Preparation of Core

A polymeric core, preform rod and optical fiber were prepared as in Example 1 above, except that the core solution contained no added core dopant.

EXAMPLE 3

A polymeric sheathing, polymeric core, plastic optical preform rod, and optical fiber were prepared as outlined in Example 1, except that 2,2,4-trimethyl-1,3-pentanediol diisobutyrate was substituted for dicyclohexyl phthalate as the sheathing dopant.

EXAMPLE 4

A polymeric sheathing, polymeric core, plastic optical preform rod, and optical fiber were prepared as outlined in Example 2, except that 2,2,4-trimethyl-1,3-pentanediol diisobutyrate was substituted for dicyclohexyl phthalate as the sheathing dopant.

EXAMPLE 5

A polymeric sheathing, polymeric core, plastic optical preform rod, and optical fiber were prepared as outlined in Example 1, except that diethyl succinate was substituted for dicyclohexyl phthalate as the sheathing dopant.

EXAMPLE 6

A polymeric sheathing, polymeric core, plastic optical preform rod, and optical fiber were prepared as outlined in Example 2, except that diethyl succinate was substituted for dicyclohexyl phthalate as the sheathing dopant.

Those skilled in the art will recognize, or be able to ascertain using no more than routine experimentation, many equivalents to the specific embodiments of the invention described herein. Such equivalents are intended to be encompassed by the following claims.

What is claimed is:

1. A method for forming a gradient index plastic optical article comprising:
   (a) forming a tube of polymeric sheathing material that is at least partially transparent to light at least one wavelength from at least one polymerizable sheathing monomer including a sheathing dopant, wherein said sheathing dopant has a refractive index less than said polymerizable sheathing monomer when polymerized without the sheathing dopant; and
   (b) forming a polymeric core that is at least partially transparent to light at at least one wavelength within the tube formed in step (a), with said core having a gradient in refractive index in a specific direction by:
      (i) filling said tube with a composition including at least one polymerizable core monomer; and
      (ii) polymerizing said core monomer, wherein a concentration gradient of the sheathing dopant within at least a portion of the core is established by redistribution of at least a portion of the sheathing dopant during polymerization.

2. The method of claim 1, wherein said tube of sheathing material is formed by:
   (a) supplying a cylindrical polymerization container;
   (b) placing a quantity of a composition including said at least one polymerizable sheathing monomer and said sheathing dopant into said container; and
   (c) polymerizing said sheathing monomer to form a hollow polymeric tube.

3. The method of claim 1, wherein the composition in step (b)(i) further includes a core dopant.

4. The method of claim 3, wherein the core dopant has a refractive index greater than that of the polymerizable core monomer when polymerized without the core dopant.

5. The method of claim 1, wherein energy is supplied during step (b)(ii).

6. The method of claim 2, wherein energy is supplied during step (c).

7. The method of claim 5, wherein said energy is in the form of heat.

8. The method of claim 6, wherein said energy is in the form of heat.

9. The method of claim 2, wherein said polymerization container is rotated during step (c).

10. The method of claim 1, wherein said polymerizable sheathing monomer and said polymerizable core monomer are different.

11. The method of claim 1, wherein said polymerizable sheathing monomer and said polymerizable core monomer are the same.

12. The method of claim 11, wherein the polymerizable monomer is methyl methacrylate.

13. The method of claim 1 further comprising the step of hot-drawing the article formed after the completion of step (b) at a predetermined temperature and speed to form a gradient index optical fiber.

* * * * *

UNITED STATES PATENT AND TRADEMARK OFFICE
CERTIFICATE OF CORRECTION

PATENT NO. : 6,776,932 B1
DATED : August 17, 2004
INVENTOR(S) : Victor M. Ilyashenko It is certified that error appears in the above-identified patent and that said Letters Patent is hereby corrected as shown below:

<u>Column 1,</u>
Line 14, "claims priority to" should read -- is a continuation of --

Signed and Sealed this

Twenty-fourth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,776,932 B1 Page 1 of 1
APPLICATION NO. : 09/445733
DATED : August 17, 2004
INVENTOR(S) : Victor M. Ilyashenko It is certified that error appears in the above-identified patent and that said Letters Patent is hereby corrected as shown below:

In Column 1, at line 14, "is a continuation of" should read
-- is a continuation-in-part of --

Signed and Sealed this

Twenty-fifth Day of September, 2007

JON W. DUDAS
*Director of the United States Patent and Trademark Office*